United States Patent
Tsai et al.

(10) Patent No.: US 6,954,645 B2
(45) Date of Patent: Oct. 11, 2005

(54) SYSTEM AND METHOD FOR CHANNEL ALLOCATION IN A MULTI-BAND WIRELESS NETWORK

(75) Inventors: Hsien-Ming Tsai, Tainan (TW); Yi-Bing Lin, Hsinchu (TW)

(73) Assignee: Quanta Computer, Inc., Taoyuan (TW)

( * ) Notice: Subject to any disclaimer, the term of this patent is extended or adjusted under 35 U.S.C. 154(b) by 450 days.

(21) Appl. No.: 10/179,275

(22) Filed: Jun. 26, 2002

(65) Prior Publication Data

US 2003/0064727 A1 Apr. 3, 2003

(30) Foreign Application Priority Data

Oct. 2, 2001 (TW) ........................................ 90124322 A

(51) Int. Cl.⁷ ................................................ H04Q 7/20
(52) U.S. Cl. .................... 455/449; 455/441; 455/452.1; 455/452.2
(58) Field of Search ................................ 455/449, 441, 455/452.1, 452.2, 455, 453, 442, 438, 436, 437, 444; 370/331; 342/109

(56) References Cited

U.S. PATENT DOCUMENTS

| | | | | |
|---|---|---|---|---|
| 5,822,696 A | | 10/1998 | Bergkvist | |
| 5,884,174 A | * | 3/1999 | Nagarajan et al. | 455/436 |
| 5,913,168 A | * | 6/1999 | Moreau et al. | 455/441 |
| 6,112,088 A | * | 8/2000 | Haartsen | 455/437 |
| 6,175,735 B1 | * | 1/2001 | Meyer | 455/440 |
| 6,192,245 B1 | * | 2/2001 | Jones et al. | 455/437 |
| 6,205,336 B1 | | 3/2001 | Ostrup et al. | |
| 6,212,382 B1 | * | 4/2001 | Watson et al. | 455/444 |

OTHER PUBLICATIONS

"Performance Analysis of Microcellization for Supporting Two Mobility Classes in Cellular Wireless Networks", Krishnan Maheshwari et al; IEEE Transactions on Vehicular Technology, vol. 49, No. 2; Mar. 2000 pp. 321–333.

"Preemption Policy for Hierarchical Cellular Network", Fabrice Valois et al.; Proceedings of 5th Int'l Workshop on Mobile Multimedia Communications, Mo Muc '98; Oct. 1998 Berlin; pp. 75–81.

"A Reversible hierarchical Scheme for Microcellular Systems with Overlaying Macrocells", R. Beraldi et al.; IEEE 1996; pp. 51–58.

"Microcellular Communication Systems with Hierarchical Overlays: Traffic Performance Models and Analysis", Stephen S. Rappaport; Proceedings of the IEE, vol. 82, No. 9; Sep. 1994; pp. 1383–1397.

* cited by examiner

*Primary Examiner*—Sonny Trinh
*Assistant Examiner*—Phuoc Doan
(74) *Attorney, Agent, or Firm*—Rabin & Berdo, P.C.

(57) ABSTRACT

Disclosed is a system and method for channel allocation in a multi-band wireless network. The system includes microcell base stations, at least one macrocell base station, a mobile station, and a channel allocation center. When the mobile station makes/receives a call or executes a handover, the channel allocation center uses repacking on demand (RoD) scheme to allocate a radio channel of either a macrocell base station or a microcell base station to the mobile station. RoD has the following steps. First, a microcell channel is trying to be allocated if available. If no microcell channel is available, a macrocell channel is then trying to be allocated. Third, if no macrocell channel is available, repacking is performed to execute a handover of another mobile station's call from the macrocell to another microcell, and to allocate a reclaimed macrocell channel to the mobile station. Otherwise, no repacking call is available and the mobile station is blocked or forced terminated. By the invention, call blocking probability and call handover rate of the mobile stations in the multi-band wireless network can be reduced, and thus users' satisfaction can be enhanced.

13 Claims, 4 Drawing Sheets

SYSTEM AND METHOD FOR CHANNEL ALLOCATION IN A MULTI-BAND WIRELESS NETWORK

This application incorporates by reference Taiwan application Ser. No. 90124322, filed on Oct. 2, 2001.

BACKGROUND OF THE INVENTION

1. Field of the Invention

The invention relates in general to a system and method for channel allocation in a multi-band wireless network, and more particularly to a system and method for channel allocation using repacking on demand (RoD) to improve call blocking probability and call handover rate.

2. Description of the Related Art

A multi-band wireless network includes base stations (BSs) and multi-band mobile stations (MSs). Many types of BSs have their radio coverage (i.e., cells) of different sizes. In the radio coverage, there are many MSs. The examples of the multi-band wireless network are Global System for Mobile Communications (GSM) 900/1800 and universal mobile telecommunications system (UMTS). In GSM 900/1800, the system consists of microcells and macrocells. Most multi-band wireless networks employ this macrocell/microcell structure. In UMTS, picocells, microcells, macrocells and hyper-cells are included in the order of cell size. The cell with larger size is overlaid with the cells with smaller sizes. This results in a hierarchical cell structure. Accordingly, the multi-band wireless network is also named multi-tier, multi-layered, multi-level, multi-mode, or hybrid cellular system. Since the macrocells/microcells structure is the most common example of multi-band wireless networks, the preferable embodiment of this invention is described based on this structure but not limited to this structure.

When a multi-band MS makes/receives a call or requests a handover, the multi-band wireless network must allocate a radio channel from either the macrocell BSs or the microcell BSs to the MS. A basic channel allocation scheme was described in the paper "Microcellular Communication Systems with Hierarchical Macrocell Overlays: Traffic Performance Models and Analysis" by Rappaport, S. S. and Hu, L. -R., Proceedings of the IEEE, Vol. 83, No. 9, pp. 1383–1397, September 1994. This basic scheme is for voice communications. In this scheme, a microcell channel is first allocated to an MS. If no microcell channel is available, a macrocell channel is then allocated to the MS. If no macrocell channel is available, the MS is blocked or forced terminated. U.S. Pat. No. 6,205,336 further applies this method to non-voice-related communication systems.

When MSs were blocked frequently, the customs will complain. Hence, the call blocking probability (i.e., the probability that a new arrival call is blocked) is a performance measure for cellular systems. In order to reduce the call blocking probability, Beraldi, R., Marano, S., and Mastroianni, C. have disclosed a method for channel allocation in the paper "A Reversible Hierarchical Scheme for Microcellular Systems with Overlaying Macrocells", Proc. of IEEE infocom, pp. 51–58, 1996. In the method, when an MS makes/receives a call or requests a handover, channel allocation is performed as the previous basic method. Moreover, when an MS in the microcell completes its call or executes a handover to another cell, the microcell channel used by the MS is released. Then the system tries to search another call using a macrocell channel, and this call is executed a handover from the macrocell to its corresponding microcell. The above-mentioned handover from a macrocell to a microcell is called "repacking". This increases the number of shared macrocell channels to reduce call blocking probability. However, the method causes very high call handover rate (i.e., average number that a call executes handovers) because of repacking. This increases signaling traffic and degrades communication quality.

The moving speed of the MS also affects the call handover rate. When a speaking high-speed MS moves across many microcells frequently and uses radio channels of these microcells, call handover rate is very high due to inter-microcell handover. To increase communication quality and reduce handover signaling traffic for the high-speed MS, the system had better allocate a macrocell channel than many microcell channels. Note that, to determine whether an MS is high-speed, a number of methods have been proposed. Examples are Doppler frequency measurement, U.S. Pat. Nos. 5,822,696, 6,192,245, 6,175,735, and 6,192,245. Since the measurement of MS speed is not essentially related to the invention, they will not be described further.

A method of channel allocation for a high-speed MS was disclosed in the article "Performance Analysis of Microcellization for Supporting Two Mobility Classes in Cellular Wireless Networks" by Maheshwari, K. and Kumar, A., IEEE Tran. on Vehicular Tech., Vol. 49, No. 2, pp. 321–333, March 2000. In this method, the system first allocates a macrocell channel to the high-speed MS. If no macrocell channel is available, then the system allocates a microcell channel to the MS. If no microcell channel is available, the MS is blocked or forced terminated. Note that, when a macrocell channel is reclaimed, the system finds a high-speed MS using a microcell channel for a call and this call is executed a handover from the microcell to the macrocell (if found). The handover from a microcell to a macrocell is called "taken-back". This decreases the inter-microcell handover rate of high-speed MSs; however, this may increase one taken-back handover as soon as a macrocell channel is reclaimed.

Another method of channel allocation for a high-speed MS was disclosed in the article "Valois, F. and Veque, V Preemption Policy for Hierarchical Cellular Network", published on $5^{th}$ IEEE Workshop on Mobile Multimedia Communication, pp. 75–81, 1998. In this method, the system first allocates a macrocell channel to a high-speed MS for voice communication. If no macrocell channel is available, the system searches for a call of a slow-speed MS using a macrocell channel, this call is executed a handover from the macrocell to its corresponding microcell (if found), and then allocates the reclaimed macrocell channel to the high-speed MS. This operation is called "preemption". If no preemption can be performed, a microcell channel is then allocated to the MS. If no microcell is available, the MS is blocked or forced terminated. However, the call blocking probability still can be improved.

SUMMARY OF THE INVENTION

The object of the invention is to propose a system and method for channel allocation in a multi-band wireless network. This invention improves the call blocking and reduces call handover to provide high service quality and enhance the satisfaction of users.

According to the object of the invention, for general or slow-speed MSs, the proposed system uses repacking on demand (RoD) scheme to allocate radio channels. In RoD, when a call attempt $call_n$ (incoming or outgoing) is new generated in the ith microcell or executed a handover to the ith microcell, the system first assigns a channel of the ith microcell to $call_n$. If no idle channel is available in the ith microcell, then the system allocates a macrocell channel to $call_n$. If no macrocell channel is idle, RoD is exercised to identify repacking candidates. Every repacking candidate is a call that satisfies the following criteria:

Criterion 1. The call occupies a macrocell channel.

Criterion 2. The microcell of this call has an idle channel.

The system with RoD selects a repacking candidate and performs a handover from the macrocell to the corresponding microcell of the repacking candidate. Then a reclaimed macrocell channel is used to serve $call_n$. If no repacking candidate is found, then $call_n$ is blocked or forced terminated.

In addition, according to the invention for high-speed MSs, the system uses RoD for high-speed MSs (abbreviated as RoD-H) scheme to allocate radio channels. In RoD-H, when a call attempt $call_n$ (incoming or outgoing) of a high-speed ST is new generated at ith microcell or executed a handover to the ith microcell, the system first assigns a macrocell channel to $call_n$. If no idle macrocell channel is available, then the system determines whether any repacking candidates of slow-speed MSs are available. If repacking candidates of slow-speed MSs are available, the system selects a repacking candidate of a slow-speed MS and performs a handover from the macrocell to the corresponding microcell, and the reclaimed macrocell channel is used to serve $call_n$. If there is no repacking candidate of slow-speed MS, then the system determines whether the ith microcell has any idle channels. If there are idle channels in the ith microcell, the system allocates the microcell channel to the high-speed MS; otherwise, the system determines whether any repacking candidates of high-speed MSs are available. If some repacking candidates of high-speed MSs are available, the system selects a repacking candidate of a high-speed MS and performs a handover from the macrocell to the corresponding microcell, and the reclaimed macrocell channel is used to serve $call_n$. Otherwise, $call_n$ is blocked or forced terminated.

The feature of the invention is that repacking is performed when the MS is trying to make/receive a new call or execute a handover to occupy a new channel. In contrast to RoD, the repacking of the conventional repacking schemes is performed when the call is completed or executed a handover to release an old microcell channel. According to the invention, repacking is performed on demand so as to reduce call handover rate and call blocking probability of MSs. In addition, RoD-H for high-speed MSs can also reduce call handover rate.

Other objects, features, and advantages of the invention will become apparent from the following detailed description of the preferred but non-limiting embodiments. The following detailed description is made with reference to the accompanying drawings.

DESCRIPTION OF THE PREFERRED EMBODIMENT

Figure 1:
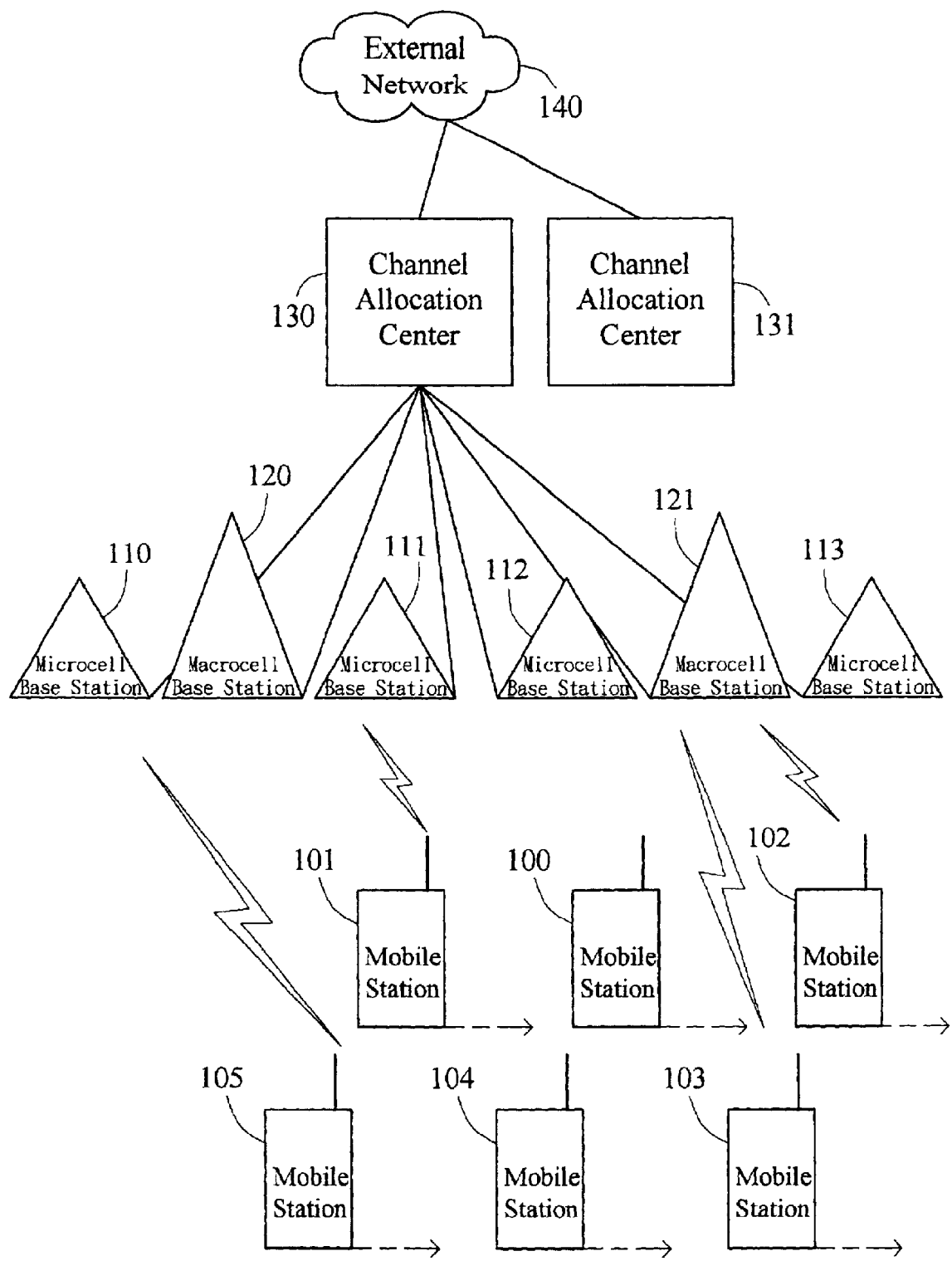
FIG. 1 illustrates the system architecture of a multi-band wireless network according to an embodiment of the invention.

FIG. 1 shows the system architecture of a multi-band wireless network according to a preferred embodiment of the invention. The multi-band wireless network includes MSs 100, 101, 102, 103, 104 and 105, microcell BSs 110, 111, 112 and 113, macrocell BSs 120 and 121, and channel allocation centers 130 and 131. The MSs 100, 101, 102, 103, 104 and 105 make/receive calls by the radio channels provided by the BSs. Each of the microcell BSs 110, 111, 112, 113 and the macrocell BSs 120 and 121 provides finite number of radio channels. The channel allocation centers 130 and 131 connect with the external network 140, and allocate the radio channels of microcell BSs 110, 111, 112, 113 and the macrocell stations 120, 121 to the MSs 100, 101, 102, 103, 104, 105 for call or handover.

In addition, the following points should be noted. (1) The channel allocation center can be either a base station controller or a mobile switching center in cellular system. Besides, the channel allocation center of the microcell BSs and that of the macrocell BSs are not necessarily co-located (i.e., distributed). (2) The services provided by the multi-band wireless network include voice communications and non-voice communications, wherein the non-voice communication services include circuit-switched data, packet-switched data, and multimedia streams. (3) The MSs of the multi-band wireless network can be moving or static, wherein the moving MSs can be either high-speed MS or slow-speed MS. The moving MSs can be used in multi-band cellular networks; on the other hand, the static MSs can be used in multi-band wireless local loop networks. (4) Since the macrocells/microcells structure is the most common example of multi-band wireless networks, the preferable embodiment is constructed on this structure. Noted that the adoption of this structure in the embodiment is not to limit the invention.

Figure 2:
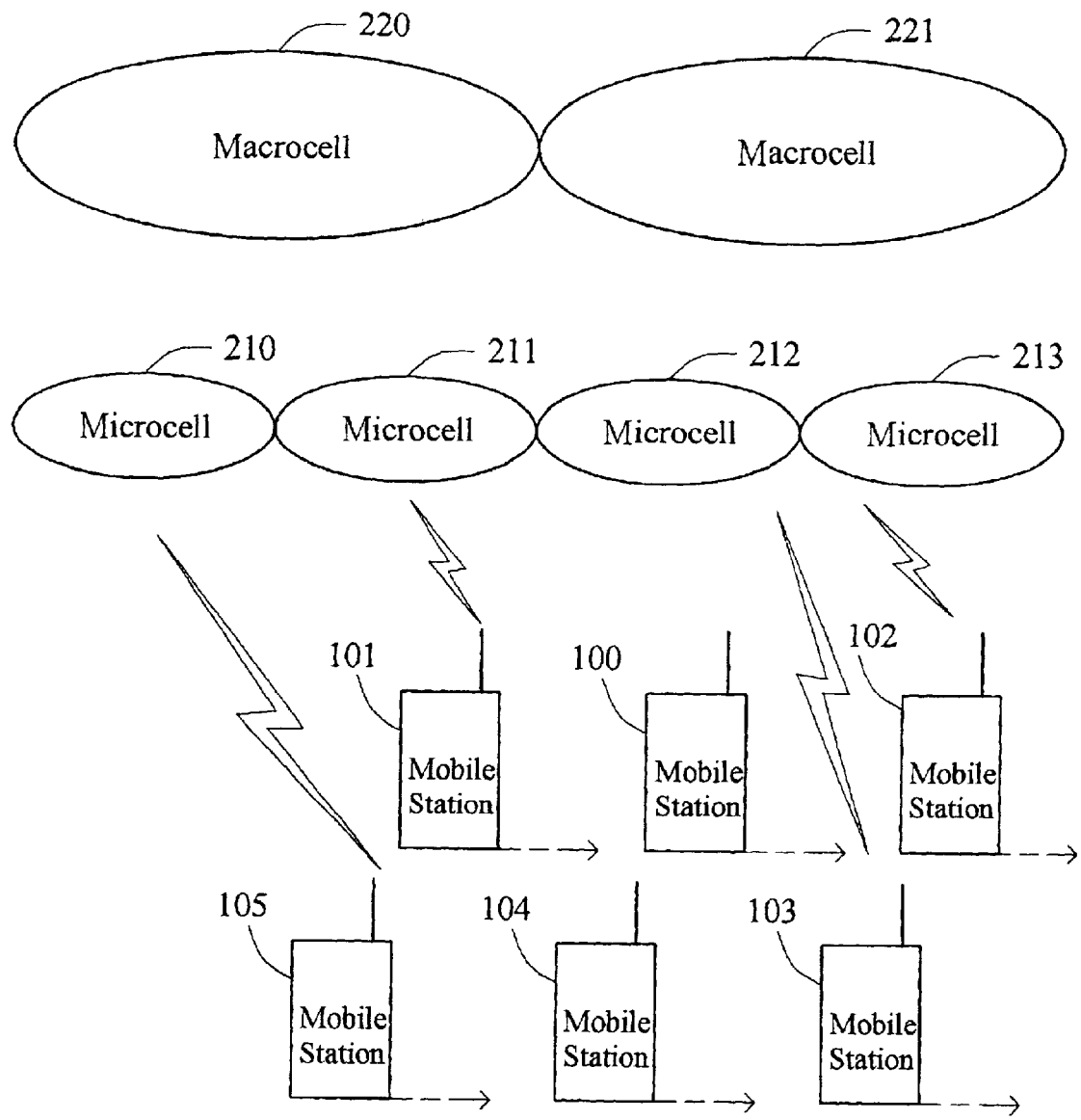
FIG. 2 is a diagram illustrating the cell overlay of the multi-band wireless network according to the embodiment of the invention.

FIG. 2 illustrates cell overlay of the multi-band wireless network. The macrocells 220 and 221 are the radio coverage of macrocell BSs 120 and 121, respectively. The microcells 210, 211, 212 and 213 are the radio coverage of microcell BSs 110, 111, 112 and 113, respectively. Macrocell 220 is overlaid with microcells 210 and 211; macrocell 221 is overlaid with microcells 212 and 213. For simplicity, six MSs are illustrated in the embodiment. MSs 100, 101, 102 are assumed to be slow-speed, and MSs 103, 104, and 105 are assumed to be high-speed. In addition, MS 100 is in macrocell 221 and microcell 212, and is trying to make/receive a call. MS 101 is moving from the current cell (e.g., macrocell 220 or microcell 211) toward the new cell (e.g., macrocell 221 or microcell 212). Because the radio quality of the current cell is poor, MS 101 is trying to initiate a handover to the new cell. MS 102 is in the macrocell 221 and microcell 213, and has a call via the macrocell BS 121. Because the microcell BS 113 has an idle radio channel, the call of MS 102 is a repacking candidate. The repacking candidate is a call that satisfies the following two criteria: (1) the call uses a macrocell channel; and (2) the corresponding MS of the call is within a microcell which has an idle radio channel. High-speed MS 103 is in the macrocell 221 and microcell 213, and has a call via macrocell BS 121. Because the microcell BS 113 has an idle radio channel, the call of MS 103 is also a repacking candidate. The high-speed MS 104 is in macrocell 221 and microcell 212, and is trying to make/receive a call. High-speed MS 105 is moving from the current cell (e.g., macrocell 220 or microcell 211) toward the new cell (e.g., macrocell 221 or microcell 212). Because the radio quality of its current cell is poor, MS 105 requests a handover to the new cell.

Channel allocation center allocates radio channels provided by BSs to MSs for call establishment or call handover. If the multi-band wireless network is not capable of detecting the speed of MSs, the network uses RoD to allocate radio channels for all the MSs. If the network is capable of detecting the speed of MSs, the channel allocation center allocates radio channels according to the moving speed of the MS. For slow-speed MSs, the channel allocation center uses RoD; on the other hand, for high-speed MSs, it uses RoD-H.

Figure 3:
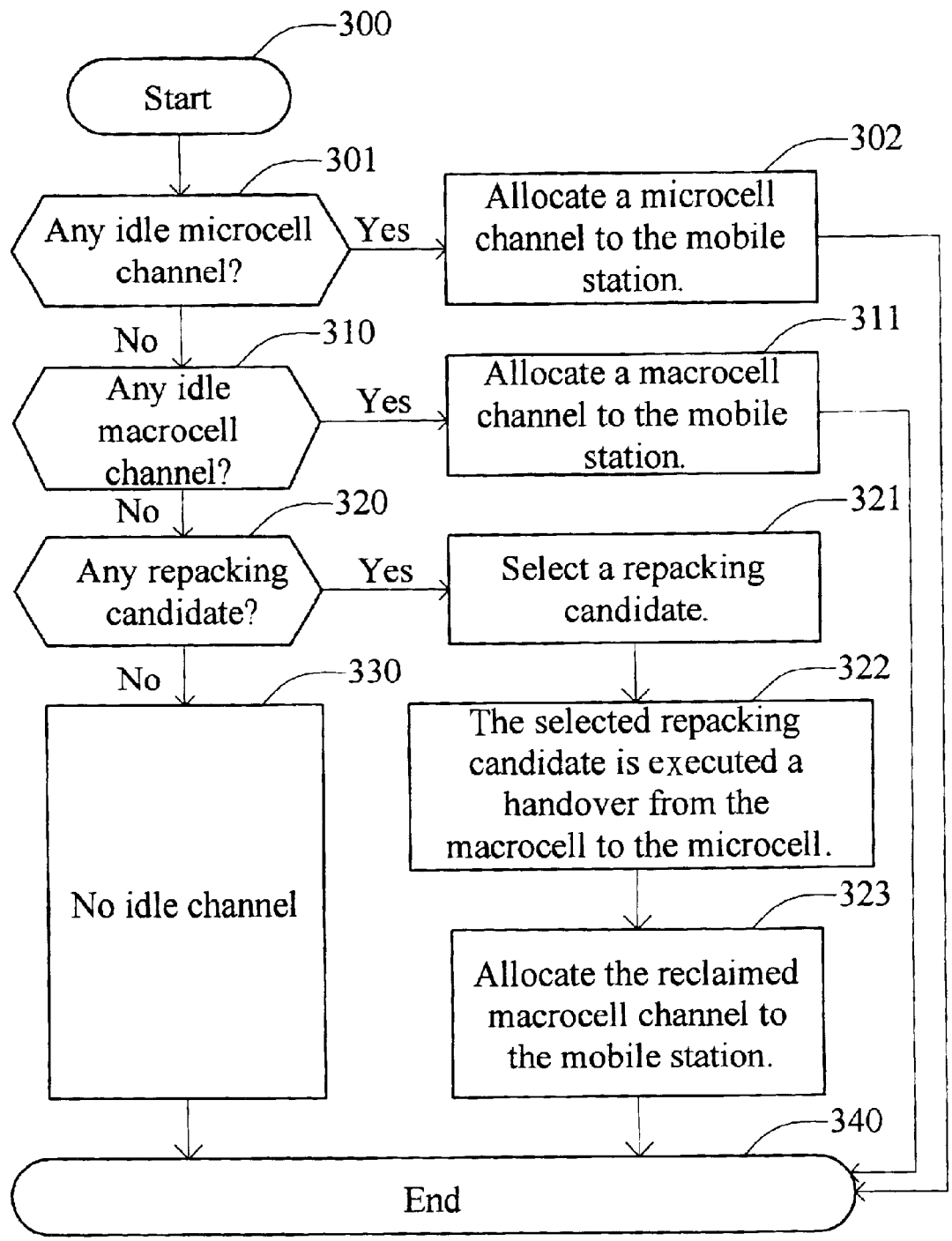
FIG. 3 is a flowchart illustrating the RoD scheme according to the embodiment of the invention.

Channel allocation center uses RoD to allocate radio channels for slow-speed MSs and MSs with unknown speed. FIG. 3 is a flowchart of RoD. Suppose that a radio channel is required for an MS. For example, MS 100 is starting to make/receive a new call, or MS 101 is executing a handover from the current BS to another BS because the signal quality is degrading. In this moment, channel allocation center 130 starts the RoD procedure, as indicated in step 300. After starting RoD, channel allocation center 130 determines whether there are any idle radio channels in microcell BS 112, as indicated in step 301. If so, one of the idle radio channels provided by the microcell BS 112 is allocated to the MS (i.e., MS 100 or MS 101) as shown in step 302, and then, in step 340, the RoD procedure ends. If not, it is determined whether there are any idle radio channels provided by the macrocell BS 121, as indicted in step 310. If there are idle radio channels provided by the macrocell BS 121, one of the idle radio channels provided by the macrocell BS 121 is allocated to the MS, as indicated in step 311, and then the RoD procedure ends in step 340. If the macrocell BS 121 has no idle radio channel, it is determined whether there are any repacking candidates, as indicated in step 320. If there are some repacking candidates (e.g., the call of MS 102 or 103), one of these repacking candidates is selected, as indicated in step 321, and a handover (i.e., repacking) is performed for the selected repacking candidate from its macrocell to its microcell in step 322. For example, if the selected repacking candidate is the call of MS 102, a handover (i.e., repacking) is executed from macrocell BS 121 to microcell BS 113. Next, in step 323, the reclaimed macrocell channel is allocated to the MS and the procedure ends in step 340. If it is determined that there is no repacking candidate in step 320, the call is dropped (i.e., MS 100 is blocked or MS 101 is forced terminated), as indicated in step 330. After that, the procedure ends in step 340. Note that when selecting a repacking candidate in step 321, channel allocation center 130 can select one of the repacking candidates for handover by different policies: (1) Channel allocation center 130 can randomly select one of the repacking candidates for handover. (2) Channel allocation center 130 can select one repacking candidate whose microcell has a maximum idle channels (i.e., the microcell has least traffic). (3) The channel allocation center 130 can select one repacking candidate which is a call of the MS with the slowest speed among MSs of the available repacking candidates.

Figure 4:
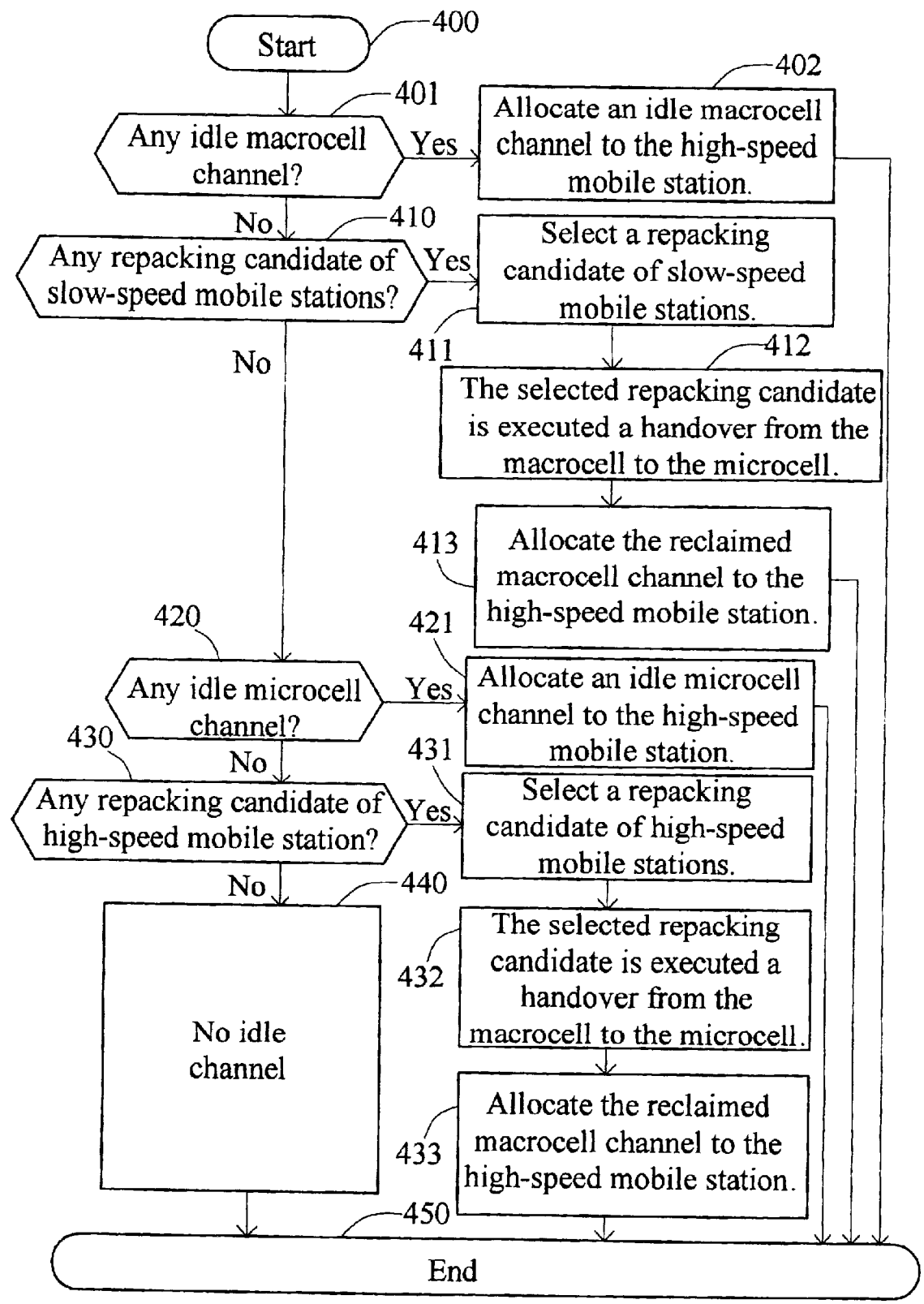
FIG. 4 is a flowchart illustrating the RoD-H scheme for high-speed MSs according to the embodiment of the invention.

Channel allocation center 130 adopts RoD-H to allocate radio channels for high-speed MSs. A flowchart of RoD-H is shown in FIG. 4. Suppose that a radio channel is required for a high-speed MS. For example, high-speed MS 104 tries to make/receive a call, or high-speed MS 105 requests a handover from the current BS to another BS because the signal quality is degrading. In this moment, channel allocation center 130 starts the RoD-H procedure for a high-speed MS (e.g., MS 104 or MS 105) as indicated in step 400. After starting up the procedure, channel allocation center 130 determines whether the macrocell BS 121 has any idle radio channels, as indicated in step 401. If so, a radio channel provided by the macrocell BS 121 is allocated to the MS as shown in step 402 and the procedure ends as indicated in step 450. If not, it is determined whether there are any repacking candidates of slow-speed MSs, as indicated in step 410. If there are some repacking candidates of slow-speed MSs, one of them is selected in step 411 and a handover of the selected repacking candidate is performed from the macrocell to the microcell of the selected repacking candidate in step 412. For example, the call of the MS 102 is selected as the repacking candidate and a handoff (i.e., repacking) is executed from the macrocell BS 121 to the microcell BS 113. After the handover, the reclaimed macrocell radio channel is allocated to the high-speed MS as shown in step 413 and then the procedure ends as indicated in step 450. If no repacking candidate of a slow-speed MS is found in step 410, it is to determine whether there are any idle channels in its microcell, as shown in step 420. If some idle microcell channels are found in step 420, one idle microcell channel is allocated to the high-speed MS as indicated in step 421 and then the procedure ends as indicated in step 450. If no idle microcell channel, it is to determine whether there are any repacking candidates made from other high-speed MSs, as indicated in step 430. If repacking candidates made from other high-speed MSs are found, one of the repacking candidates is selected in step 431, a handover of the selected repacking candidate is performed from the macrocell to the microcell of the selected repacking candidate, as indicated in step 432. For example, the repacking candidate of the high-speed MS 103 is selected and a handoff (i.e., repacking) is executed from the macrocell BS 121 to the microcell BS 113. After the handover, the reclaimed macrocell radio channel is allocated to the high-speed MS as shown in step 433 and then the procedure ends as indicated in step 450. If it is determined that there is no repacking candidate made from high-speed MSs as shown in step 430, it indicates that no idle channel is available to serve the high-speed MS. Thus, the call is dropped (i.e., high-speed MS 104 is blocked or high-speed MS 105 is forced terminated). Finally, in step 450, the procedure ends. Note that, in steps 411 and 431, channel allocation center 130 can select one of the repacking candidates for handover by different policies. For example, it can select one of the repacking candidates randomly or select the repacking candidate whose microcell BS has a maximum number of idle radio channels among the available repacking candidates.

As disclosed above, the invention uses RoD for channel allocation in a multi-band wireless network. When an MS makes/receives a call or requests a handover for a radio channel, a repacking candidate is executed a handover from its macorcell to its microcell, and a reclaimed macrocell channel is allocated to the MS. This reduces the call blocking probability and call handover rate for MSs. Accordingly, service quality of cellular network provider is improved and satisfaction of users is also enhanced.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system for channel allocation in multi-band wireless network, comprising:
   a plurality of microcell base stations, providing a plurality of microcell channels;
   a macrocell base station, providing a plurality of macrocell channels, wherein the radio coverage of the macrocell base station is overlaid with that of the microcell base stations;
   a mobile station, capable of making and receiving a call by using a channel from the microcell channels and the macrocell channels; and
   a channel allocation center, capable of performing repacking on demand (RoD) scheme for allocating a first one of the macrocell channels and the microcell channels to a first one of the mobile stations for a call;
   wherein the RoD scheme comprises:
   determining whether there are any idle radio channels provided by one of the microcell base stations for the mobile station; if so, allocating an idle radio channel provided by a first one of the microcell base stations to the mobile station, and then ending the scheme; if not, proceeding to the following steps;
   determining whether there are any idle radio channels provided by the macrocell base station for the mobile station; if so, allocating an idle radio channel provided by the macrocell base station to the mobile station, and then ending the scheme; if not, proceeding to the following steps;
   determining whether there are any available repacking candidates in the macrocell base station for the mobile station; if so, selecting a repacking candidate and executing a handover of the repacking candidate from the macrocell base station to the microcell base station of the repacking candidate, and allocating the macrocell channel reclaimed from the repacking candidate to the mobile station, and then ending the scheme; if not, ending the scheme if no idle radio channel is available.

2. The system according to claim 1, wherein the repacking candidate is randomly selected from available repacking candidates by the channel allocation center.

3. The system according to claim 1, wherein the repacking candidate is selected from available repacking candidates by the channel allocation center, wherein the microcell base station of the selected repacking candidate has a maximum number of idle radio channels among those of the available repacking candidates.

4. The system according to claim 1, wherein the repacking candidate is selected from available repacking candidates by the channel allocation center, wherein the selected repacking candidate is generated from a mobile station with the slowest speed among other mobile stations that generate the available repacking candidates.

5. A system for channel allocation in a multi-band wireless network, comprising:
   a plurality of microcell base stations, providing a plurality of microcell channels,
   a macrocell base station, providing a plurality of macrocell channels, wherein the radio coverage of the macrocell base station is overlaid with that of the microcell base stations;
   a mobile station, capable of making and receiving a call by using a channel from the microcell channels and the macrocell channels; and
   a channel allocation center, capable of performing repacking on demand (RoD) scheme for allocating a first one of the macrocell channels and the microcell channels to a first one of the mobile stations for a call, wherein the channel allocation center is capable of detecting high-speed mobile stations and using repacking on demand for high-speed mobile stations (RoD-H) scheme to allocate one of the macrocell channels and microcell channels to a high-speed mobile station;
   wherein the RoD-H scheme comprises:
   determining whether any idle radio channels are available in the macrocell base station of the high-speed mobile station; if so, allocating an idle macrocell channel to the high-speed mobile station and then ending the scheme; otherwise, proceeding to the following step;
   determining whether any repacking candidates of slow-speed mobile stations exist in the macrocell base station of the high-speed mobile station; if so, selecting a repacking candidate of a slow-speed mobile station, executing a handover from the macrocell base station to the microcell base station of the repacking candidate of the slow-speed mobile station, allocating a reclaimed macrocell channel to the high-speed mobile station and then ending the scheme; otherwise, proceeding to the following step;
   determining whether any idle radio channels are available in the microcell base station of the high-speed mobile station; if so, allocating an idle microcell channel to the high-speed mobile station and then ending the scheme; otherwise, proceeding to the following step;
   determining whether any repacking candidates of another high-speed mobile station exist in the macrocell base station of the high-speed mobile station; if so, selecting a repacking candidate of a first high-speed mobile station, executing a handover from the macrocell base station to the microcell base station of the repacking candidate of first high-speed mobile station, allocating a reclaimed macrocell channel to the high-speed mobile station and then ending the scheme; otherwise
   ending the scheme if no idle radio channel is available for the high-speed mobile station.

6. The system according to claim 5, wherein the repacking candidate is randomly selected from available repacking candidates by the channel allocation center.

7. The system according to claim 5, wherein the repacking candidate is selected from available repacking candidates by the channel allocation center, wherein the microcell base station of the selected repacking candidate has a maximum number of idle radio channels among those of the available repacking candidates.

8. A method for channel allocation of a mobile station in a multi-band wireless network, the method comprising the steps of:
   determining whether any idle radio channel provided by the microcell base station of the mobile station are available; if so, allocating an idle radio channel of the microcell base station to the mobile station and then ending the method; otherwise, proceeding to the following steps;
   determining whether any idle radio channel provided by the macrocell base station of the mobile station is available; if so, allocating an idle radio channel of the macrocell base station to the mobile station and then ending the method; if not, proceeding to the following steps;
   determining whether any repacking candidates exist in the macrocell base station of the mobile station; if so, selecting a repacking candidate, executing a handover from the macrocell base station to the microcell base station of the selected repacking candidate, and allocating a reclaimed radio channel in the macrocell base station to the mobile station and then ending the method; if not, ending the method if no idle radio channel is available for the mobile station.

9. The method according to claim 8, wherein the method is to be performed when the mobile station is trying to make a call.

10. The method according to claim 8, wherein the method is to be performed when the mobile station executes a handover from the current base station to a new base station.

11. A method for channel allocation of a high-speed mobile station in a multi-band wireless network, the method comprising the steps of:

determining whether any idle radio channels are available in a macrocell base station of the high-speed mobile station; if so, allocating an idle macrocell channel to the high-speed mobile station and then ending the method; otherwise, proceeding to the following step;

determining whether any repacking candidates of slow-speed mobile stations exist in the macrocell base station of the high-speed mobile station; if so, selecting a repacking candidate of slow-speed mobile stations, executing a handover from the macrocell base station to the microcell base station of the repacking candidate, allocating a reclaimed macrocell channel to the high-speed mobile station and then ending the method; otherwise, proceeding to the following step;

determining whether any idle radio channel are available in the microcell base station of the high-speed mobile station; if so, allocating an idle microcell channel to the high-speed mobile station and then ending the method; otherwise, proceeding to the following step;

determining whether any repacking candidates of other high-speed mobile stations exist in the macrocell base station of the high-speed mobile station; if so, selecting a first repacking candidate of another high-speed mobile station, executing a handover from the macrocell base station to the microcell base station of the first repacking candidate, allocating a reclaimed macrocell channel to the high-speed mobile station and then ending the method; otherwise, ending the method if no idle radio channel is available for the mobile station.

12. The method according to claim 11, wherein the method is to be performed when the high-speed mobile station is trying to make a call.

13. The method according to claim 11, wherein the method is to be performed when the high-speed mobile station executes a handover from the current base station to a new base station.

* * * * *